(12) United States Patent
Lee et al.

(10) Patent No.: US 8,285,330 B2
(45) Date of Patent: Oct. 9, 2012

(54) HARQ REORDERING METHOD FOR WCDMA ENHANCED UPLINK DEDICATED CHANNEL

(75) Inventors: Ju-Ho Lee, Suwon-si (KR); Kook-Heui Lee, Yongin-si (KR); Jeong-Gon Kim, Seoul (KR); Hyeon-Woo Lee, Suwon-si (KR); Shuwei Zhang, Beijing (CN); Jing Zhao, Beijing (CN); Chunying Sun, Beijing (CN)

(73) Assignees: Samsung Electronics Co., Ltd., Suwon-si (KR); Beijing Samsung Telecom R&D Center, Beijing (CN)

( * ) Notice: Subject to any disclaimer, the term of this patent is extended or adjusted under 35 U.S.C. 154(b) by 0 days.

(21) Appl. No.: 10/545,520

(22) PCT Filed: Feb. 17, 2004

(86) PCT No.: PCT/KR2004/000320
§ 371 (c)(1),
(2), (4) Date: Sep. 25, 2006

(87) PCT Pub. No.: WO2004/073273
PCT Pub. Date: Aug. 26, 2004

(65) Prior Publication Data
US 2007/0042782 A1    Feb. 22, 2007

(30) Foreign Application Priority Data
Feb. 17, 2003    (CN) .................................. 03 1 03703

(51) Int. Cl.
*H04B 1/38* (2006.01)
(52) U.S. Cl. ......... 455/560; 455/561; 455/442; 370/331
(58) Field of Classification Search ....... 455/432.1–453; 370/329–334
See application file for complete search history.

(56) References Cited

U.S. PATENT DOCUMENTS
5,805,576 A * 9/1998 Worley et al. ................. 370/337
(Continued)

FOREIGN PATENT DOCUMENTS
GB    2361 392 A    10/2001
(Continued)

OTHER PUBLICATIONS

TSG-RAN WG1 #31 Meeting "Enhanced Uplink DCH" 3GPP Document TSG_RAN.
(Continued)

*Primary Examiner* — Lester Kincaid
*Assistant Examiner* — Mehmood B Khan
(74) *Attorney, Agent, or Firm* — Roylance, Abrams, Berdo & Goodman, LLP

(57) ABSTRACT

A method for HARQ reordering in Enhanced Uplink Dedicated Channel of WCDMA system includes following steps: locating the soft combination buffer in the Node B and the reordering buffer in the SRNC; locating the HARQ entity in the Node B; locating the reordering queue distribution entity, the reordering entity and the disassembly entity in the SRNC. This invention adopts the separation technology of the soft combination buffer and the reordering buffer, the separation model can not only ensure the diversity gain, but also reduce the receiving delay and save the buffer space. Three mechanisms (timer mechanism, window mechanism and SBI mechanism) are proposed to prevent the blocking of the reordering buffer, which degrades the blocking to the least level, improves the receiving efficiency and the system performance. Aiming at the SBI mechanism, the invention proposes the new DCH data frame structure on the Iub interface and the Iur interface.

13 Claims, 8 Drawing Sheets

U.S. PATENT DOCUMENTS

| | | | |
|---|---|---|---|
| 6,137,784 A * | 10/2000 | Wallerius et al. | 370/328 |
| 6,192,038 B1 * | 2/2001 | Wallerius et al. | 370/328 |
| 6,333,936 B1 | 12/2001 | Johansson et al. | |
| 6,347,091 B1 | 2/2002 | Wallentin et al. | |
| 6,349,094 B1 * | 2/2002 | Vastano et al. | 370/328 |
| 6,374,112 B1 | 4/2002 | Widegren et al. | |
| 6,678,249 B2 * | 1/2004 | Toskala et al. | 370/236 |
| 6,678,523 B1 * | 1/2004 | Ghosh et al. | 455/442 |
| 7,013,143 B2 * | 3/2006 | Love et al. | 455/450 |
| 7,054,316 B2 * | 5/2006 | Cheng et al. | 370/394 |
| 7,369,521 B2 * | 5/2008 | Frederiksen et al. | 370/318 |
| 2001/0018345 A1 * | 8/2001 | Longoni et al. | 455/436 |
| 2002/0021698 A1 * | 2/2002 | Lee et al. | 370/394 |
| 2002/0196760 A1 * | 12/2002 | Malomsoky et al. | 370/338 |
| 2003/0045288 A1 * | 3/2003 | Luschi et al. | 455/434 |
| 2003/0161280 A1 * | 8/2003 | Gruhn et al. | 370/328 |
| 2004/0009786 A1 * | 1/2004 | Terry | 455/522 |
| 2004/0052229 A1 * | 3/2004 | Terry et al. | 370/335 |
| 2004/0116143 A1 * | 6/2004 | Love et al. | 455/522 |
| 2004/0120306 A1 * | 6/2004 | Wigard et al. | 370/349 |
| 2004/0228313 A1 * | 11/2004 | Cheng et al. | 370/342 |
| 2005/0018644 A1 * | 1/2005 | Gessner et al. | 370/349 |
| 2005/0022098 A1 * | 1/2005 | Vayanos et al. | 714/776 |
| 2005/0054359 A1 * | 3/2005 | Ishii et al. | 455/513 |
| 2005/0141477 A1 * | 6/2005 | Tomita et al. | 370/349 |
| 2006/0268880 A1 * | 11/2006 | Zhao et al. | 370/394 |
| 2008/0212588 A1 * | 9/2008 | Yi et al. | 370/394 |
| 2009/0175222 A1 * | 7/2009 | Yi et al. | 370/328 |
| 2009/0245272 A1 * | 10/2009 | Peisa et al. | 370/428 |

FOREIGN PATENT DOCUMENTS

| | | | |
|---|---|---|---|
| WO | WO 02/03600 A | | 1/2002 |
| WO | WO 02/21757 A | | 3/2002 |
| WO | WO 02/065797 | | 8/2002 |
| WO | WO 02/091659 | * | 11/2002 |
| WO | WO 02/096006 A | | 11/2002 |
| WO | WO 02/096044 A1 | | 11/2002 |

OTHER PUBLICATIONS

XP 050141303, 3rd Generation Partnership Project; Technical Specification Group Radio Access Network; UTRA High Speed Downlink Packet Access (Release 4), 3GPP TR 25.950 V4.0.0 (Mar. 2001).

XP 014008709, Universal Mobile Telecommunications System (UMTS); Medium Access Control (MAC) Protocol Specification (3GPP TS 25.321 version 3.14.0 Release 1999); ETSI TS 125 321 V3.14.0 (Dec. 2002).

* cited by examiner

| | |
|---|---|
| 401 | MAC-EU PDU TSN = 1 (SBI = 1) |
| | ↓ |
| 402 | MAC-EU PDU TSN = 3 (SBI = 0) |
| | ↓ |
| 403 | MAC-EU PDU TSN = 4 (SBI = 0) |
| | ↓ |
| 404 | MAC-EU PDU TSN = 5 (SBI = 0) |
| | ↓ |
| 405 | MAC-EU PDU TSN = 6 (SBI = 0) |
| | ↓ |
| 406 | MAC-EU PDU TSN = 7 (SBI = 0) |
| | ↓ |
| 407 | MAC-EU PDU TSN = 8 (SBI = 0) |
| | ↓ |
| 408 | MAC-EU PDU TSN = 9 (SBI = 1) |

FIG.4

HARQ REORDERING METHOD FOR WCDMA ENHANCED UPLINK DEDICATED CHANNEL

BACKGROUND OF THE INVENTION

1. Field of the Invention

This invention relates to a method for Hybrid Automatic Repeat Request reordering in Enhanced Uplink Dedicated Channel in WCDMA (Wideband Code Division Multiple Access) mobile communication system.

2. Description of the Related Art

Enhanced Up-link Dedicated Channel (simplified as EUDCH hereinafter) is a research project under standardization proposed by version 6 of 3rd Generation Partner Project (3GPP). The purpose of EUDCH is to improve the up-link capacity of the system through efficient management and planning for up-link transmission resources of the wireless network, and to make it applicable to the transmission of data service with high bursts. It improves the percentage of coverage and the throughput of the cell, improves uplink transmission rate as well as reduces uplink delay through improving the performance of uplink dedicated transfer channel. Main technologies adopted are as follows:

- Adaptive modulation and coding scheme
- Hybrid automatic repeat request protocol
- Node B (Base Station) control and scheduling
- Fast dedicated channel set-up
- Short frame structure and improvement of the quality of service
- Support of relevant physical layer and higher layer signaling Hybrid Automatic Repeat Request (HARQ) is one of the main technologies. This invention proposes the application method of the HARQ technology in EUDCH with emphasis on the operating method for reordering.

In the existing WCDMA mobile communication system, the standard about detailed operating method for HARQ in EUDCH doesn't exist yet. In principle, HARQ operation in EUDCH can be regarded as the inverse process of the HARQ operation in High Speed Data Packet Access (HSDPA). In the following, the relevant definition of the HARQ reordering in HSDPA will be explained.

FIG. 1 presents a structure of UE side MAC-hs (Medium Access Control—high speed) entity in HSDPA.

The MAC-hs handles the HSDPA specific functions. In the model below the MAC-hs comprises the following entities:

101 HARQ: The HARQ entity is responsible for handling the MAC functions relating to the HARQ protocol. The HARQ functional entity handles all the tasks that are required for hybrid ARQ. It is responsible for generating ACKs or NACKs. The detailed configuration of the hybrid ARQ protocol is provided by RRC over the MAC-Control SAP.

102 Reordering Queue distribution: The reordering queue distribution function routes the MAC-hs PDUs to the correct reordering buffer based on the Queue ID.

103 Reordering: The reordering entity reorders received MAC-hs PDUs according to the received TSN. MAC-hs PDUs with consecutive TSNs are delivered to the disassembly function upon reception. MAC-hs PDUs are not delivered to the disassembly function if MAC-hs PDUs with lower TSN are missing. There is one reordering entity for each Queue ID configured at the UE.

104 Disassembly: The disassembly entity is responsible for the disassembly of MAC-hs PDUs. When a MAC-hs PDU is disassembled the MAC-hs header is removed, the MAC-d PDUs are extracted and any present padding bits are removed. Then the MAC-d PDUs are delivered to higher layer.

The associated signalling shown in the figure illustrates the exchange of information between layer 1 and layer 2.

At the receiver, there are two buffers, i.e. a soft combining buffer at the physical layer and a re-ordering buffer at the MAC layer. The soft combining buffer is used to combine retransmissions and decode the data These two buffers are both located in the receiver, i.e. the UE (User Equipment).

If the existing HARQ reordering technology is applied to EUDCH, following two problems may be resulted in:

1) It is not preferable to dispose both soft combining buffer and reordering buffer at the Node B. Considering the case of soft handoff, each Node B in active set is receiving uplink data and the data correctly received by each Node B or not may be different. So it is unnecessary to set a reordering buffer at each Node B, which makes latency too long and results in delay in one aspect, and in another aspect may result in waste of the buffer space. Only if one Node B correctly receives the data, the data can be directly sent to the SRNC (Serving Radio Network Controller) and reordered uniformly at the SRNC, which can obtain the most effective diversity gain.

2) In some cases, the reodering buffer can result in perpetual data loss and then result in the queue hole. In conclusion, following several situations may happen:

- NACK is understood as ACK by mistake. In this case, the UE won't retransmit this packet but starts to transmit the new packets.
- If the retransmission retry of the certain data is too large or the retransmission time reaches at the certain limitation, the UE will give up the retransmission and starts to send new data.
- If the transmission of the certain data is preempted by other queue with higher priority, the UE will give up the retransmission and starts to send the new data.

If preferable measure isn't adopted to deal with the above several cases, it will result in queue stop, thus correctly received data can't be sent upward and the buffer overflows.

SUMMARY OF THE INVENTION

The purpose of this invention is to provide a solution with separate models, i.e. separating the soft combining e buffer from the reordering buffer. The soft combining buffer is located in the Node B and the reordering buffer is located in the SRNC respectively. Thus not only the diversity gain of many Node Bs is ensured, but also the queue latency is reduced and the buffer space is saved.

To realize the above purposes, a method for the HARQ reordering in Uplink Channel of telecommunication system includes plurality of Node Bs having soft combine buffers respectively and a RNC having reordering buffer, control each of the Node Bs comprising following steps:

receiving, at the Node Bs, packet data from mobile terminal and storing the received data in the soft combining buffer respectively;

decoding the received data with channel decoder in each Node Bs;

transmitting an Acknowledge or Non-acknowledge information to the mobile terminal;

transmitting, at the Node Bs, the decoded data to the RNC;

buffering each decoded data in the reordering buffer; and reordering the decoded data in the RNC.

To achieve the above purposes, a method for the HARQ reordering in Uplink Channel of telecommunication system includes Node B having soft combining buffer and a RNC having reordering buffer, comprising following steps:

receiving, at the Node B, packet data from mobile terminal and storing the received data in the soft combining buffer;

decoding the received data with channel decoder in Node B;

transmitting an Acknowledge or Non-acknowledge information to the mobile terminal;

transmitting, at the Node B, the decoded data to the RNC;

buffering the decoded data in the reordering buffer; and reordering the decoded data in the RNC.

To achieve the above purposes, a telecommunication system having hybrid automatic repeat request (HARQ) function, the system comprising;

plurality of Node Bs, at least one of the Node Bs communicates with a terminal, for receiving packet data from a mobile terminal, decoding the packet data and transmitting acknowledgement signal or non-acknowledgement signal to the terminal according to the decoding result;

the mobile terminal for transmitting the packet data and repeating transmission of the packet data when the terminal receive the non-acknowledgement signal; and a RNC for controlling the Node Bs, receiving decoded data from the Node B, reordering the packet data according to a packet sequence of the packet data, wherein, the Node B having soft combining buffer buffering the packet data and combining first transmission packet data and second transmission packet data when the Node B receive the packet data again.

The soft combining buffer have two combining method, the first one is chase combining method which combines same packet dada received from first transmission and second transmission. And second another one is IR (incremental redundancy) which combine different version of same packet data.

Aiming at the second problem in the existing technology, this invention proposes three solutions of the operation mechanism.

a) Timer mechanism
b) Window mechanism
c) Soft combination buffer state indicatiing (SBI) mechanism These three mechanisms are independent with each other and can be used separately. But in order to reach the optimal performance, the three mechanisms shall be used simultaneously as a combination scheme to maximally eliminate the blocking state and to reach the optimal effect.

The introduction of SBI mechanism needs the support of the new Iub and Iur signaling. This invention proposes an improved DCH data frame structure.

This invention proposes the corresponding MAC-EU (Medium Access Control—Enhanced Uplink) entity structure by adopting the separation technology of the soft combination buffer and the reordering buffer. This separation model can not only ensure the diversity gain, but also reduce the receiving delay and save the buffer space. Three mechanisms are proposed (timer mechanism, window mechanism and SBI mechanism) to prevent the blocking of the reordering buffer, which degrades the blocking to the least level, improves the receiving efficiency and improves the system performance. The invention needs to modify the data frame structure on the Iub interface and the Iur interface to support the new SBI mechanism.

BRIEF DESCRIPTION OF THE DRAWINGS

FIG. 4 gives a illustration for state shifting of a SBI (soft combination buffer state indicating) according to the example in the FIG. 3;

DETAILED DESCRIPTION OF THE PREFERRED EMBODIMENTS

This invention is consisted of the contents of three aspects.

MAC-EU distributed scheme;

Reordering buffer blocking avoidance scheme; (including three mechanisms, i.e. the timer mechanism, the window mechanism, and the SBI mechanism)

New signaling scheme under the SBI mechanism;

In the following, the contents of each part will be explained in detail:

MAC-EU Distributed Scheme

In the soft handoff state, several Node Bs in the active set are receiving the uplink data, and the soft combining buffer must be located in the Node B to ensure the diversity gain. The reordering buffer shall be located in the SRNC. After each Node B correctly receives the packet, it will send the packet to the SRNC right away. If there are duplicate data, the SRNC will identify it according to the sequence number (TSN) and discard it automatically. All correctly received packets are queued uniformly in the SRNC.

Figure 1:
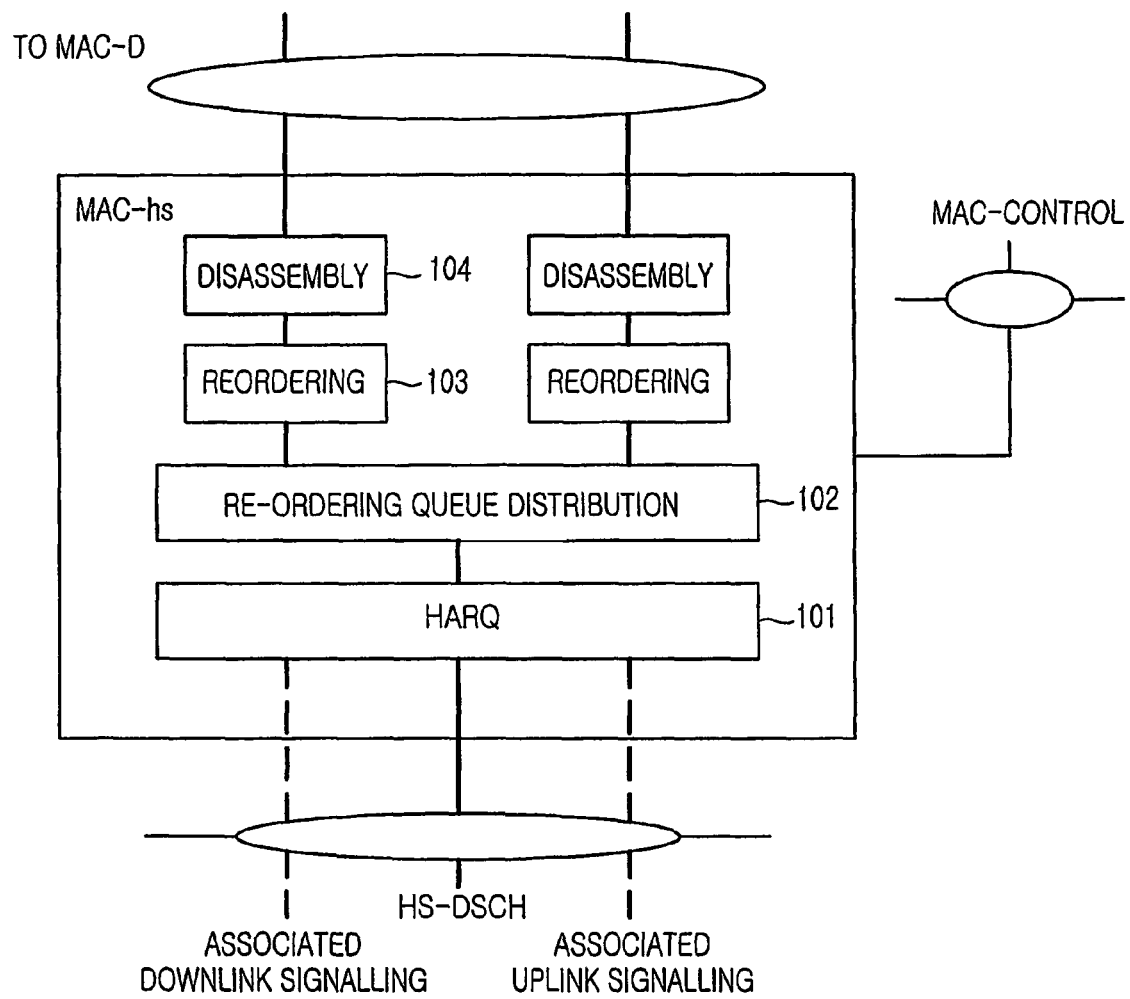
FIG. 1 shows a structure of UE side MAC-hs entity.
Figure 2:
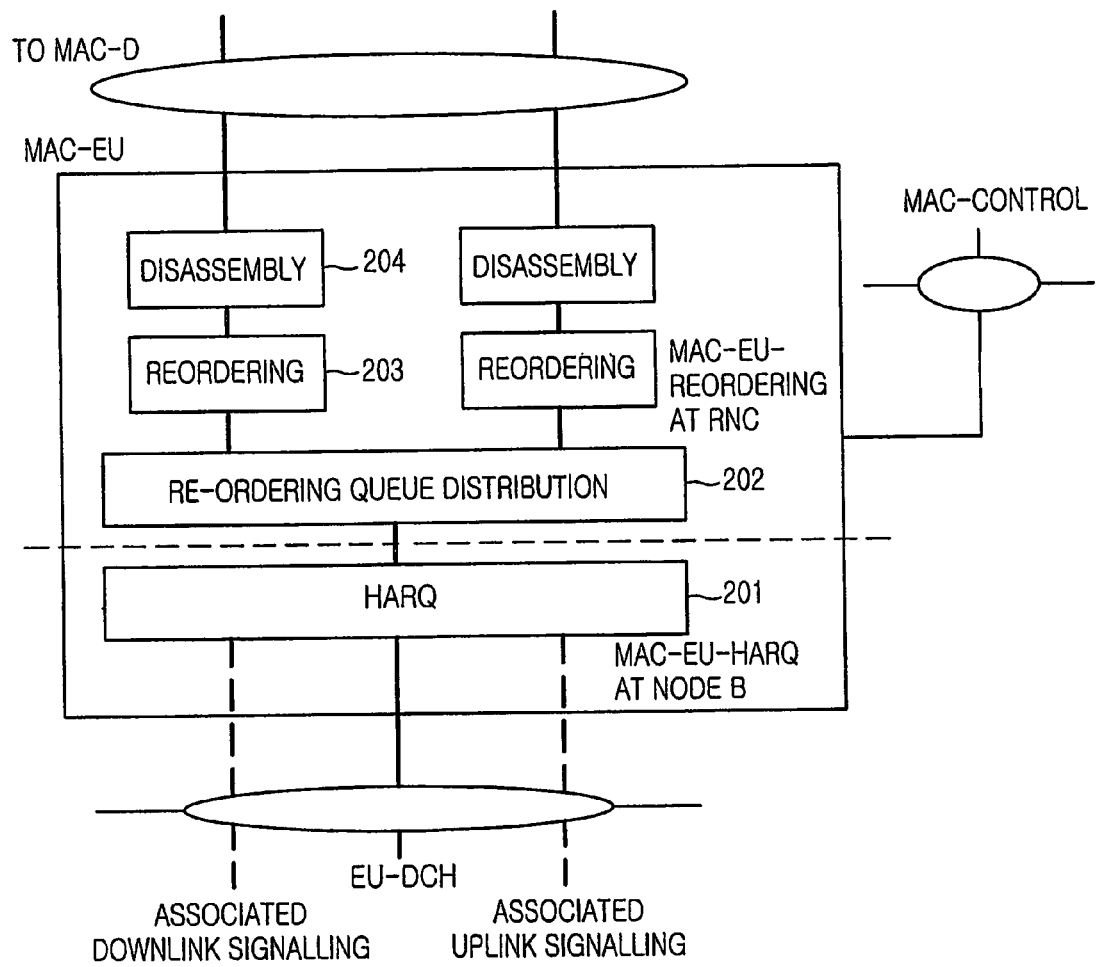
FIG. 2 shows a structure of a MAC-EU entity at an EUDCH.

Accordingly, as illustrated in FIG. 2, in the MAC-EU entity of EUDCH, the HARQ entity shall be located in the Node B, while the reordering queue distribution entity, the reordering entity and the disassembly entity shall all be located in the SRNC. The detailed structure of the MAC-EU entity (FIG. 2) will be explained in the embodiments.

Reordering Buffer Blocking Avoidance Scheme

In order to avoid the blocking of the reordering buffer due to the losses of the certain PDUs, new operation mechanism needs to be defined. Here three mechanisms are proposed, which are introduced respectively in the following. These three mechanisms are independent with each other and can be used separately. But in order to reach the optimal performance, the three mechanisms shall be used simultaneously as a combination scheme to maximally eliminate the blocking state and to reach the optimal effect.

1) Timer Mechanism

Set a transmission timer (Timer T) at the UE, which is used to control the retransmission time and to prevent the unlimited retransmissions. So the UE can only perform retransmission before the termination of the timer. Each time when a new packet is sent, the Timer T is activated; When the UE receives an ACK, the counting stops. If the UE receives a NACK, it retransmits this packet until the timer expires. At this time, the UE gives up the retransmission and starts to send new packets. The time duration of the Timer T is configured by the upper layer.

At the receiver of the SRNC, each queue sets a reordering buffer, and it is the release timer (Timer R) that controls the latency of the empty position. Each time when a MAC-EU PDU is received, if the position with lower sequence number is empty, it cannot be sent upward to the upper layer, and then the Timer R is started up. If the Timer R expires and the position is still empty, it won't wait any more and the position is released. Subsequent data correctly received are delivered to the upper layer. The time duration of the Timer R is configured by the upper layer.

Figure 5:
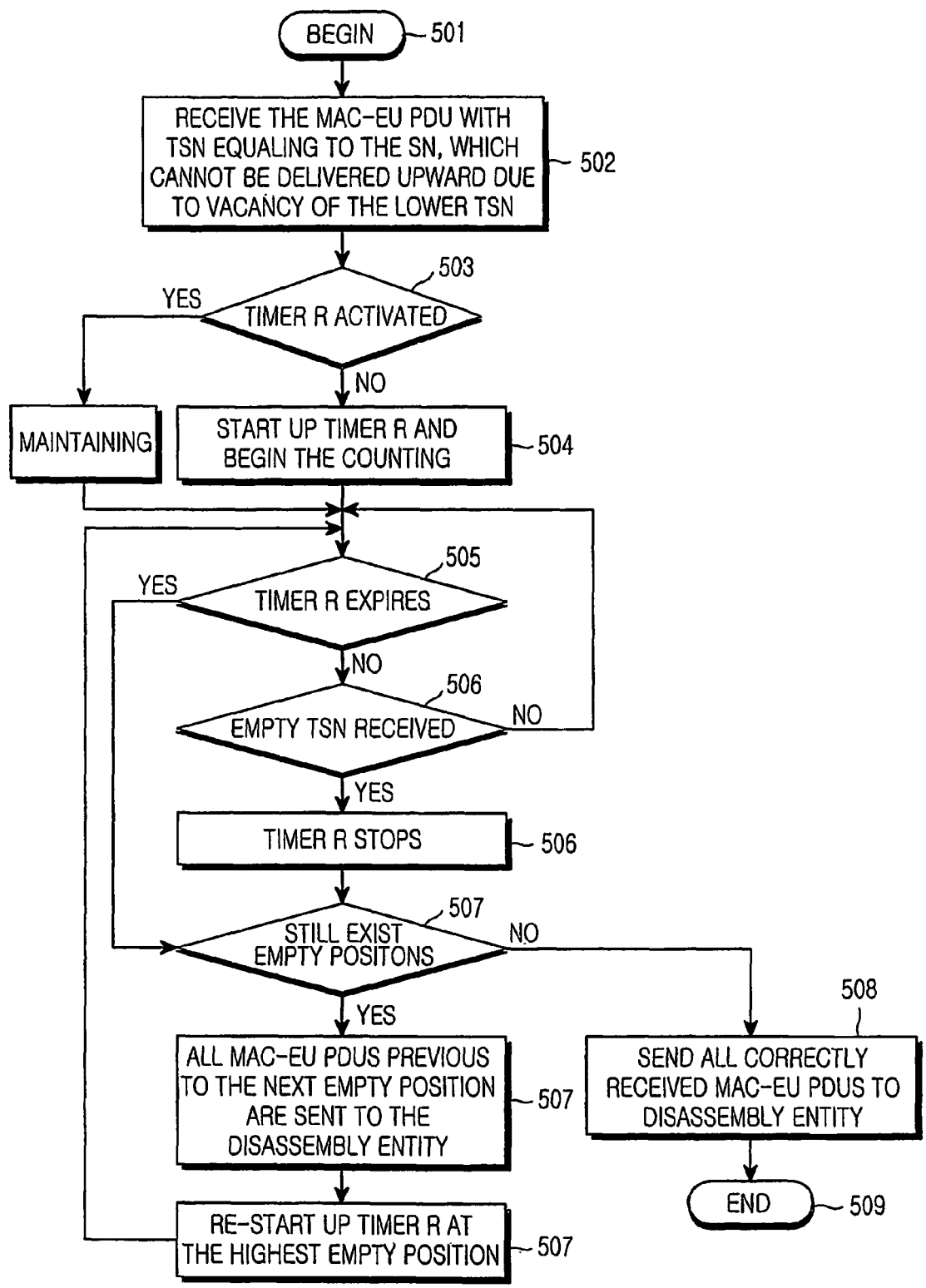
FIG. 5 is an operation flowchart for the SRNC reordering based on the timer mechanism.

The operation rules for the SRNC reordering buffer under the timer mechanism will be explained in detail in the afterward embodiments (FIG. 5).

2) Window Mechanism

If a window is defined at the UE, the MAC-EU PDU won't result in the confusion of the transmission sequence number (TSN) at the receiver. The size of the transmission window is set as TRANSMIT_WINDOW, whose maximum value is a half of the TSN length range. The upper layer determines the configuration of the TRANSMIT-WINDOW.

After the UE transmits a MAC-EU PDU with TSN=SN, all MAC-EU PDUs satisfying that TSN≦SN−TRANSMIT_WINDOW cannot be retransmitted, which can prevent the confusion of the sequence number at the receiver. The MAC-EU PDUs that have been given up by the sender won't be retransmitted forever.

If a receiving window is defined at the SRNC, receiving MAC-EU PDU within the window won't result in the window to slide forward. The size of the receiving window is set as RECEIVE_WINDOW, whose maximum value is a half of the TSN length range. The configuration of the RECEIVE_WINDOW is determined by the upper layer.

Figure 6:
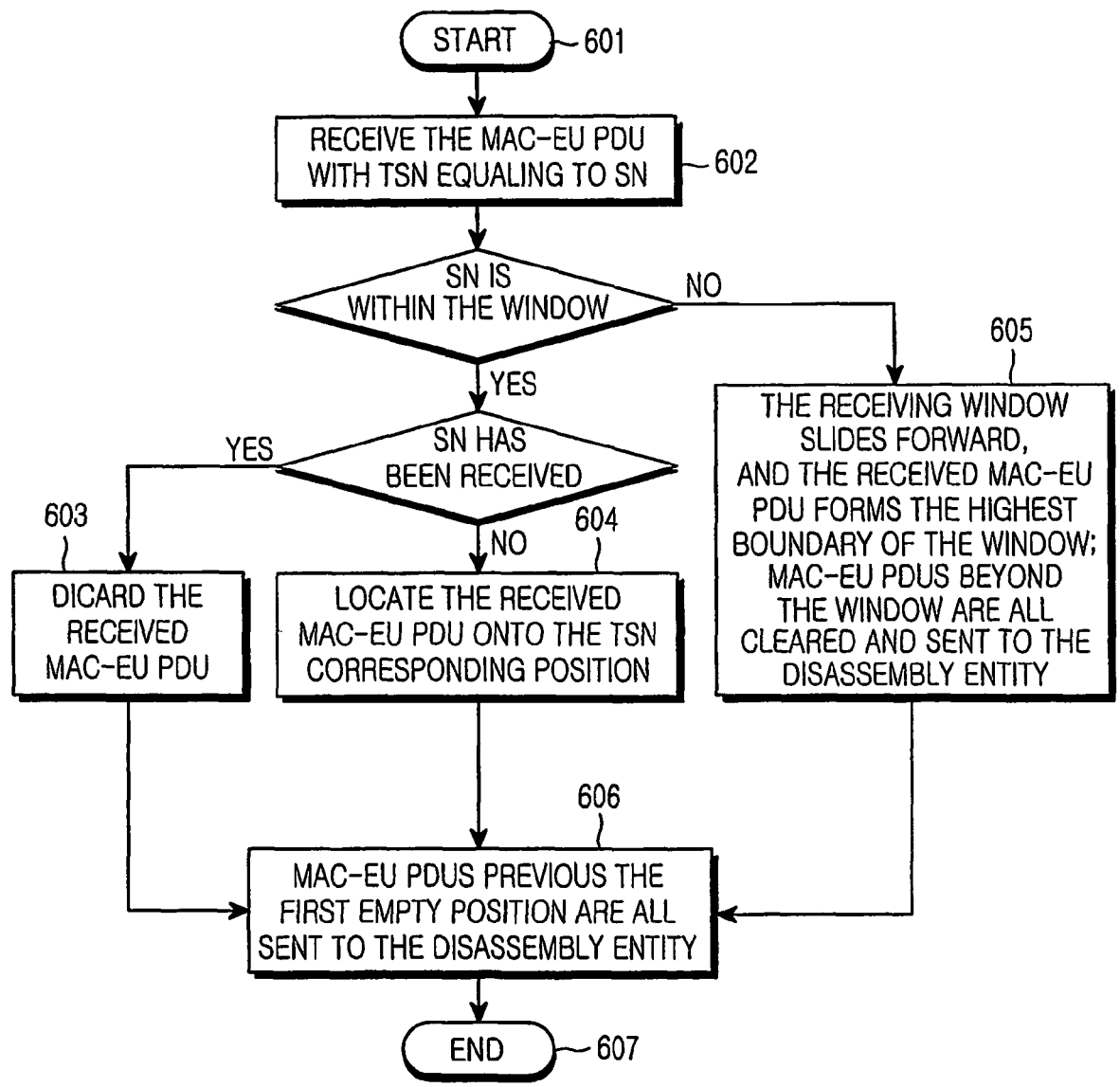
FIG. 6 is an operation flowchart for the SRNC reordering based on the window mechanism.

The operation rules for the SRNC reordering buffer under the window mechanism will be explained in detail in the afterward embodiments (FIG. 6).

3) Soft Combining Buffer State Indicating (SBI) Mechanism

Even employing the timer mechanism and the window mechanism, some blocking cases still cannot be solved. Refer to the example in FIG. 3: We assume that the TSN is 6-bit long, and so its length range is 64, and the RECEIVE_WINDOW is 32, so the soft combining buffer has 4 processes.

After the packet with TSN of 2 fails in retransmission about several times, the UE gives up the retransmission and sends the new packets in the same process. At this time, the state of the reordering buffer is shown in the figure. The position with TSN of 2 is empty. The timer R stays in the counting state and the packets with TSN of 3 and 9 are blocked, unable to be sent to the upper layer. The receiving window isn't be pushed forward. In this situation, the SRNC cannot release the reordering buffer in time, and only through waiting for the termination of the timer or the sliding of the window, the position with TSN of 2 can be emptied, which will result in delay and blocking. At this time, if the SRNC knows the state of the soft combination buffer in the Node B, it can quickly release the reordering buffer to prevent the deadlock state. So, Node B needs to send the soft combination buffer state indication bit to the SRNC which can better prevent the blocking after knowing this information.

Each time when the Node B correctly receives a packet, it sends the packet to the SRNC right away. At the same time a SBI bit accompanied is sent in bundling with the data. The SBI bit has two states:

SBI=1: Indicate that all processes in the soft combination buffer are empty, i.e. no data need to be retransmitted.

SBI=0: All other states.

Figure 7:
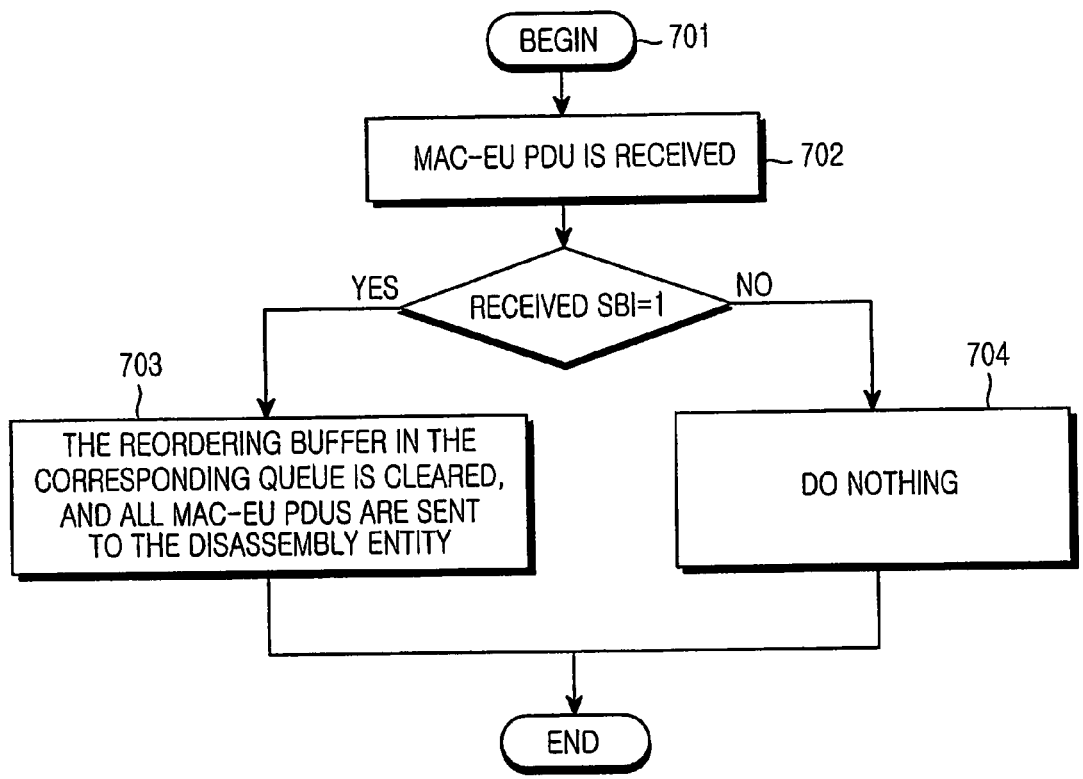
FIG. 7 is an operation flowchart for the SRNC reordering based on the SBI mechanism.

The operation rules for the SRNC reordering buffer under the SBI mechanism will be explained in detail in the afterward embodiments (FIG. 7).

New signaling scheme under the SBI mechanism.

Figure 8:
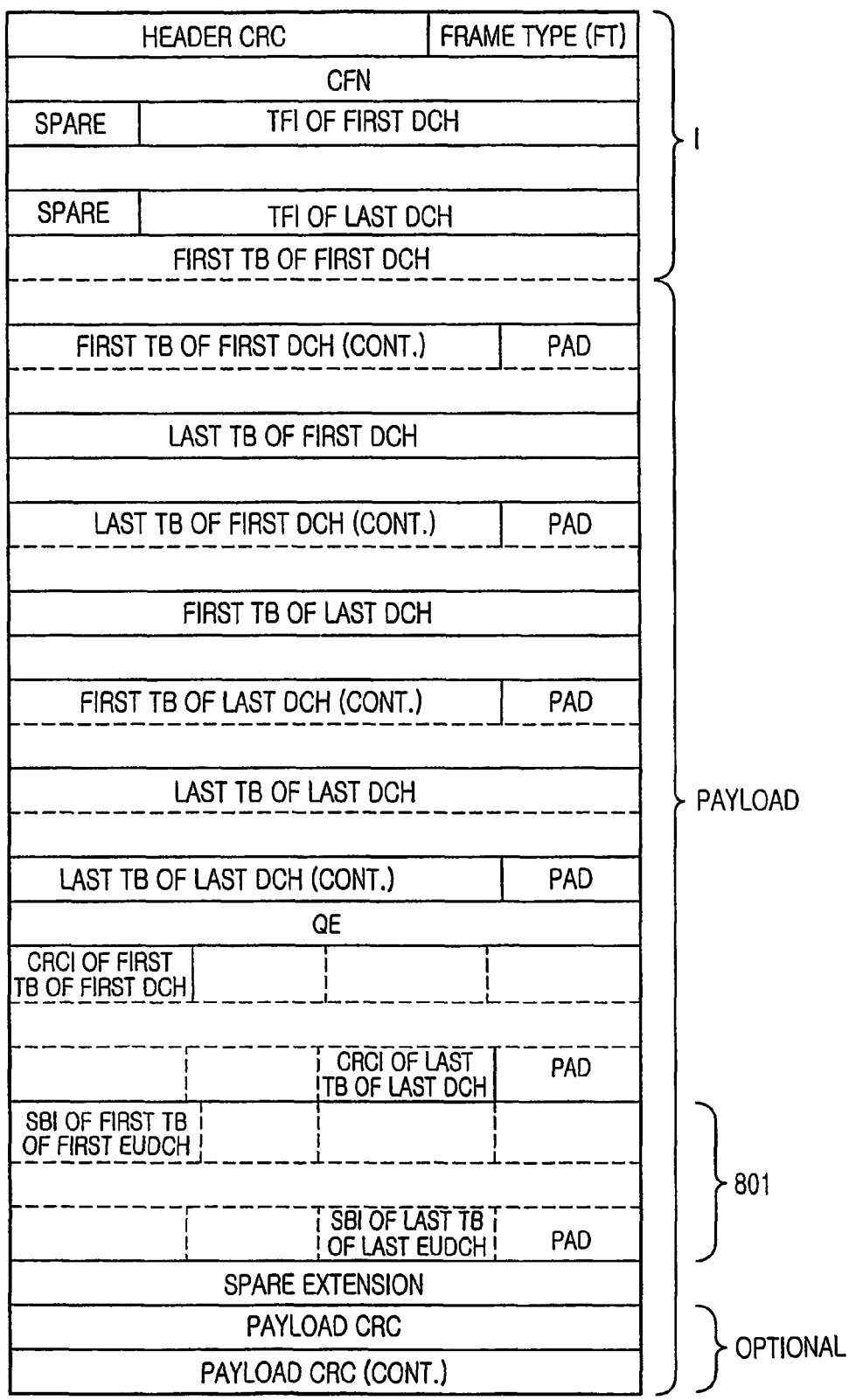
FIG. 8 is an illustration for a structure of a DCH (Dedicated Channel) data frame with the SBI added.

The introduction of the SBI bit results in the modification to the Iub and Iur data flow protocols. In the following embodiment (FIG. 8), the uplink (from the Node B to the SRNC) DCH data frame structure on the Iub interface is modified. As the DCH data flow specification on the Iub interface is the same as that on the Iur interface, the data frame structure in FIG. 8 is also applicable to the Iur interface.

FIG. 2 gives the distributed architecture of the MAC-EU entity. From the figure we can see that the HARQ entity is located in the Node B, while the reordering queue distribution entity, the reordering entity and the disassembly entity are all located in the SRNC. The distributed MAC-EU entity is the key precondition for SBI signaling in our invention. In SHO, the distributed MAC-EU scheme means that MAC-EU HARQ entity locating in Node B side and MAC-EU reordering entity locating in SRNC side and this will make system benefit from diversity gain and stall avoidance. Due to multi Node Bs receiving and soft combination separately at respective Node B, diversity gain is obtained. Also because MAC-EU reordering entity is located at SRNC side and SRNC receives multi data streams from Node Bs in active set, SRNC will have the ability to disassemble the MAC-EU PDUs faster.

In the model below the distributed MAC-EU comprises of the following entities:

201 HARQ: The HARQ entity is responsible for handling the MAC functions relating to the HARQ protocol. The HARQ functional entity handles all the tasks that are required for hybrid ARQ. It is responsible for generating ACKs or NACKs. The detailed configuration of the hybrid ARQ protocol is provided by RRC over the MAC-Control SAP. This entity is located in Node B side.

202 Reordering Queue distribution: The reordering queue distribution function routes the MAC-EU PDUs to the correct reordering buffer based on the Queue ID. This entity is located in SRNC side.

203 Reordering: The reordering entity reorders received MAC-EU PDUs according to the received TSN. MAC-EU PDUs with consecutive TSNs are delivered to the disassembly function upon reception. MAC-EU PDUs are not delivered to the disassembly function if MAC-EU PDUs with lower TSN are missing. There is one reordering entity for each Queue ID configured at the UE.

204 Disassembly: The disassembly entity is responsible for the disassembly of MAC-EU PDUs. When a MAC-EU PDU is disassembled the MAC-EU header is removed, the MAC-d PDUs are extracted and any present padding bits are removed. Then the MAC-d PDUs are delivered to higher layer.

The associated signalling shown in the figure illustrates the exchange of information between layer 1 and layer 2.

FIG. 5 is the operation flowchart for the SRNC reordering based on the timer mechanism.

501 Start.

502 The MAC-EU PDU with the TSN equaling to the SN is received, but as the position with lower TSN number is empty, it cannot be sent upward.

503 Detect whether there is a Timer R activated, and only one Timer R can be in the activate state at one time.

504 If no Timer R stays in the activate state at this time, start up the Timer R and the counting.

505 If the Timer R expires, detect whether the positions with higher TSN are still empty.

506 If the empty TSN is received before the Timer R expires, stop the Timer R and detect whether the empty positions with higher TSN are still exist.

507 If there is still empty position, all MAC-EU PDUs previous to the next empty position are all sent to the disassembly entity. Then re-start the Timer R at the empty position with the highest TSN and start counting.

508 If no other empty position exists, send all MAC-EU PDUs correctly received to the disassembly entity.

509 End.

FIG. 6 is the operation flowchart for the SRNC reordering based on the window mechanism.

601 Start.

602 The MAC-EU PDU with the TSN equaling to the SN is received.

603 Although the SN is within the receiving window, as the TSN has been received, the current MAC-EU PDU will be discarded.

604 If the SN is within the receiving window and this TSN hasn't been received before, put the MAC-EU PDU onto the corresponding TSN position.

605 If the SN is beyond the window, the SN becomes the highest boundary of the new window and the window slides forward. The MAC-EU PDUs beyond the window will all be sent to the disassembly entity.

606 All MAC-EU PDUs before the first empty position of the window will all be sent to the disassembly entity.

607 End.

FIG. 7 is the operation flowchart for the SRNC reordering based on the SBI mechanism.

701 Start.

702 The MAC-EU PDU with the TSN equaling to the SN is received.

703 Detect the SBI bit accompanied, if SBI=1, clear the reordering buffer corresponding to the queue and all MAC-EU PDU received are sent to the disassembly entity.

704 If SBI=0, do nothing.

705 End.

Figure 3:
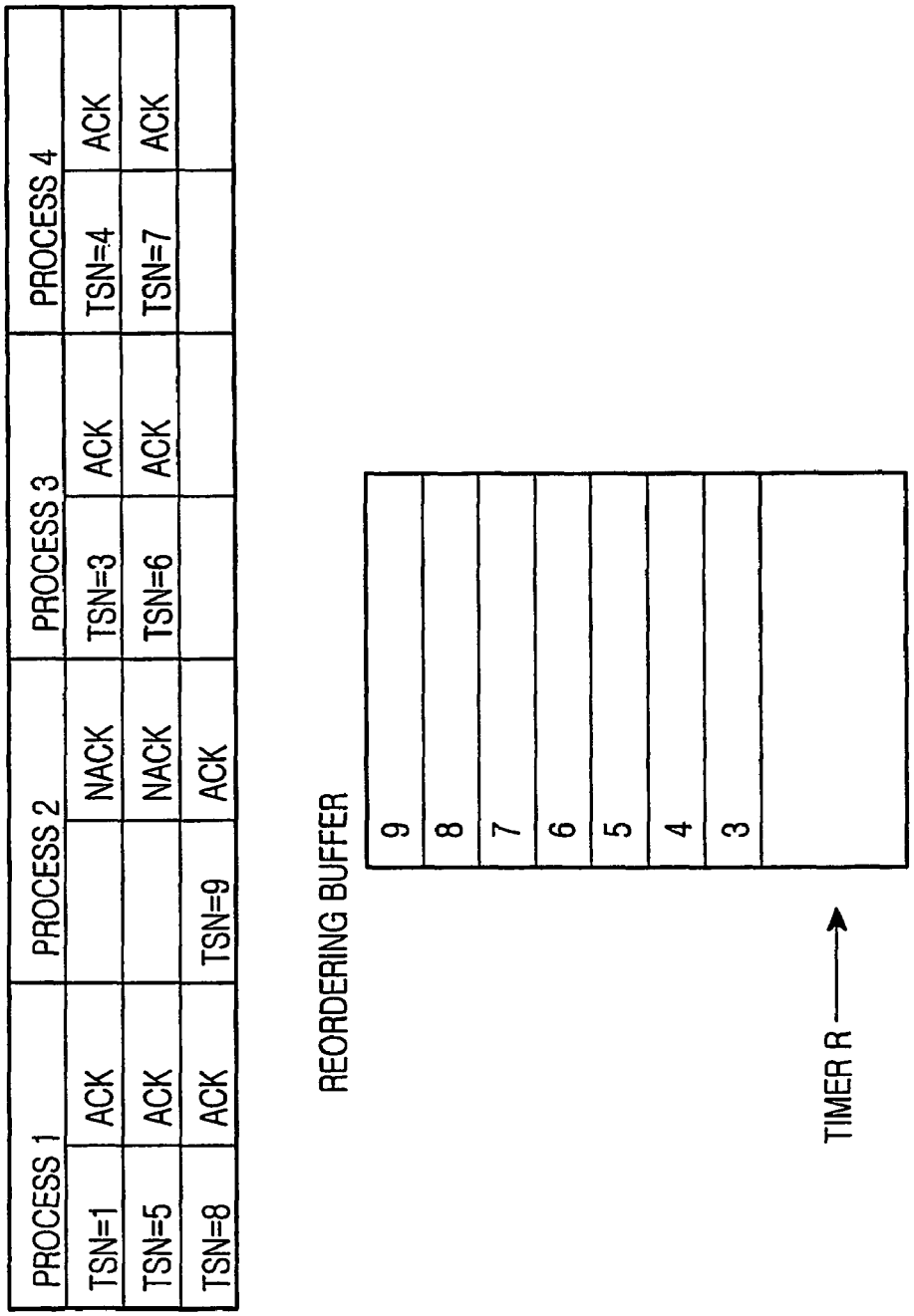
FIG. 3 exemplifies a blocking state that cannot be solved by the timer-based and window-based mechanisms.

FIG. 4 is the illustration for the SBI state shifting given according to the example in FIG. 3.

401 The MAC-EU PDU with TSN of 1 is correctly received, and the SBI bit accompanied is 1. As all processes have no data for retransmission at this time, all process buffers are empty.

402 The MAC-EU PDU with TSN of 3 is correctly received, and the SBI bit accompanied is 0. As the process 2 has data for retransmission, the process 2 is not empty.

403 The MAC-EU PDU with TSN of 4 is correctly received, and the SBI bit accompanied is 0. The reason is the same as above.

404 The MAC-EU PDU with TSN of 5 is correctly received, and the SBI bit accompanied is 0. The reason is the same as above.

405 The MAC-EU PDU with TSN of 6 is correctly received, and the SBI bit accompanied is 0. The reason is the same as above.

406 The MAC-EU PDU with TSN of 7 is correctly received, and the SBI bit accompanied is 0. The reason is the same as above.

407 The MAC-EU PDU with TSN of 8 is correctly received, and the SBI bit accompanied is 0. The reason is the same as above.

408 The MAC-EU PDU with TSN of 9 is correctly received, and the SBI bit accompanied is 1. As all processes have no data for retransmission at this time, all process buffers are empty.

FIG. 8 shows the DCH data frame structure with the addition of the SBI.

801 Add a SBI bit for each TB in the DCH data frame structure to indicate the state of the soft combination buffer.

What is claimed is:

1. A method for Hybrid Automatic repeat Request reordering in Enhanced Uplink Dedicated Channel of Wideband Code Division Multiple Access system, comprising the steps of:

after correctly receiving a packet data transmitted from a mobile terminal, sending, at a Node B, the correctly received packet data to a serving radio network controller;

generating, at a hybrid automatic retransmission repeat request entity located in the Node B, an Acknowledge or Non-acknowledge information corresponding to each of the received packet data, and transmitting the generated Acknowledge or Non-acknowledge information to the mobile terminal; and generating, at the serving radio network controller, a MAC-d packet data based on the correctly received packet data;

wherein the generating the MAC-d packet data step comprises, routing, at a reordering queue distribution entity located in the serving radio network controller, the correctly received packet data to a correct reordering buffer;

reordering, at a reordering entity located in the serving radio network controller, the routed packet data according to a sequence number (TSN) of the routed packet data, and outputting the reordered packet data; and extracting, at a disassembly entity located in the serving radio network controller, the MAC-d packet data in the outputted packet data from the reordering entity, which is packet data removed from a header of the outputted packet data.

2. The method according to claim 1, further comprising setting a transmission timer at a user equipment to control the retransmission time and a release timer at the serving radio network controller to control the waiting time.

3. The method according to claim 1, further comprising setting a transmission window at the user equipment to prevent the transmission sequence number confusion at the receiver and a receiving window at the serving radio network controller to control the sliding of the receiving window.

4. The method according to claim 3, wherein the maximum value of said transmission window is a half of the transmission sequence number length range.

5. The method according to claim 3, wherein the maximum value of said receiving window is a half of the transmission sequence number length range.

6. The method according to claim 1, further comprising:

sending a soft combination buffer state indication bit by said Node B at the same time of transmitting a medium access control-enhanced uplink protocol data unit; and detecting the soft combination buffer state indication bit by the serving radio network controller at the same time of receiving the medium access control-enhanced uplink protocol data unit and deciding whether to clear the reordering buffer according to a soft combination state indicated in the soft combination buffer state indication bit.

7. The method according to claim 6, wherein the soft combination buffer state indication bit has two states: state 1 indicates that all processes in a soft combination buffer located in the Node B are empty and no data are needed to be retransmitted; and other cases belong to the state 0.

8. The method according to claim 6, wherein the soft combination buffer state indication bit is added for each transfer block and the data frame structure on an Iub interface is the same as that on an Iur interface.

9. A method for a hybrid automatic repeat request (HARQ) reordering in Uplink Channel of a mobile communication system including at least one of Node B having soft combine buffers and a serving radio network controller (SRNC) having a reordering buffer, comprising the following steps:

receiving, at the Node Bs, packet data from a mobile terminal;

generating, at a hybrid automatic retransmission repeat request entity located in the Node B, an Acknowledge or Non-acknowledge information corresponding to each of the received packet data, and transmitting the generated Acknowledge or Non-acknowledge information to the mobile terminal;

sending, at a hybrid automatic retransmission repeat request entity, a correctly received packet data to a serving radio network controller that are packet data transmitted with the Acknowledge information;

routing, at a reordering queue distribution entity located in the serving radio network controller, the correctly received packet data to a correct reordering buffer;

reordering, at a reordering entity located in the serving radio network controller, the routed packet data according to a sequence number (TSN) of the routed packet data, and outputting the reordered packet data; and extracting, at a disassembly entity located in the serving radio network controller, the MAC-d packet data in the outputted packet data from the reordering entity, which is packet data removed from a header of the outputted packet data.

10. The method according to claim 9, wherein the reordering entity does not output reordered packet data if the routed packet data with a lower sequence number (TSN) are missing.

11. A mobile communication system supporting a hybrid automatic repeat request (HARQ) function, the system comprising;

after correctly receiving a packet data transmitted from a mobile terminal, a hybrid automatic retransmission repeat request entity located in a Node B configured for sending the correctly received packet data to a serving radio network controller; and the serving radio network controller configured for generating MAC-d packet data based on the correctly received packet data;

wherein the serving radio network controller comprises, a reordering queue distribution entity configured for routing the correctly received packet data to a correct reordering buffer;

a reordering entity configured for reordering the routed packet data according to a sequence number (TSN) of the routed packet data, and outputting the reordered packet data; and a disassembly entity configured for extracting the MAC-d packet data in the outputted packet data from the reordering entity, which is packet data removed from a header of the outputted packet data.

12. The system according to claim 11, wherein the reordering entity does not output reordered packet data if the routed packet data with a lower sequence number (TSN) are missing.

13. The method according to claim 1, wherein the reordered packet data are not output to the disassembly entity if the routed packet data with a lower sequence number (TSN) are missing.

* * * * *